United States Patent [19]

Beichel

[11] Patent Number: 5,715,673
[45] Date of Patent: Feb. 10, 1998

[54] REDUCED POLLUTION POWER GENERATION SYSTEM

[75] Inventor: Rudi Beichel, Sacramento, Calif.

[73] Assignee: Clean Energy Systems, Inc., Sacramento, Calif.

[21] Appl. No.: 670,084

[22] Filed: Jun. 25, 1996

Related U.S. Application Data

[63] Continuation of Ser. No. 299,417, Aug. 25, 1994.

[51] Int. Cl.$^6$ .................................................. F02C 3/14
[52] U.S. Cl. ..................... 60/39.07; 60/39.17; 60/39.55; 60/257; 60/730; 431/158; 431/160
[58] Field of Search .................. 60/39.02, 39.05, 60/39.07, 39.12, 39.17, 39.465, 39.53, 39.55, 39.57, 39.59, 257, 722, 730; 431/158, 160

[56] References Cited

U.S. PATENT DOCUMENTS

| | | | |
|---|---|---|---|
| 2,417,835 | 3/1947 | Moore | 60/39.55 |
| 3,101,592 | 8/1963 | Robertson et al. | 60/39.02 |
| 3,459,953 | 8/1969 | Hughes et al. | |
| 3,574,507 | 4/1971 | Kydd | 60/749 |
| 3,779,212 | 12/1973 | Wagner | |
| 3,972,180 | 8/1976 | Van Gelder | 60/39.55 |
| 4,434,613 | 3/1984 | Stahl | 60/39.07 |
| 4,456,069 | 6/1984 | Vigneri | |
| 4,498,289 | 2/1985 | Osgerby | 60/39.17 |
| 4,825,650 | 5/1989 | Hosford | 60/39.465 |
| 4,845,940 | 7/1989 | Beer | 60/748 |
| 4,928,478 | 5/1990 | Maslak | 60/39.05 |

FOREIGN PATENT DOCUMENTS

| | | | |
|---|---|---|---|
| 2111602 | 7/1983 | United Kingdom | 60/39.07 |
| 94010427 | 5/1994 | WIPO | 60/39.05 |

*Primary Examiner*—Timothy Thorpe
*Assistant Examiner*—Ted Kim
*Attorney, Agent, or Firm*—Bradley P. Heisler

[57] ABSTRACT

Five embodiments of Pollution-Free, Efficient, Large Scale Electrical Power Generation Systems, using thermal energy are illustrated herein. Each embodiment is composed of subsystems and/or individual elements which tailor each system to an operating environment that requires different implementation modes or applications.

Also illustrated are two embodiments configured to adapt smaller scale power plants to applications such as platform mounted portable power applications, large vehicle propulsion, and other applications.

Also illustrated is an embodiment configured to produce high quality fluid at controlled pressures and temperatures as required by a wide range of industrial applications.

19 Claims, 7 Drawing Sheets

REDUCED POLLUTION POWER GENERATION SYSTEM

This application is a continuation of application Ser. No. 08/295,417, filed Aug. 25, 1994.

BACKGROUND OF THE INVENTION

1. Field of the Invention

This invention involves the efficient generation of environmentally clean energy, focused on the commercial generation of electrical power. This invention has a number of additional industrial applications where the working fluid used requires variable temperatures and pressures such as in food processing, oil well high energy gas injection medical and greenhouse facility constant temperature control, and other applications.

2. Description of the Related Art

The current art in generating a major portion of commercial levels of electrical power, in the United States and world-wide, depends upon thermal generating plants burning hydrocarbon fuels (mainly coal and low grade fuel oils) with air, which contains 23.1% oxygen and 76.9% nitrogen by weight, to generate high enthalpy steam which, in turn, is used to drive turbo-electric generators.

The technology of designing, constructing and operating extremely high energy generators for jet engines, rocket engines, and gas turbine auxiliary power systems, has been significantly advanced in recent years. Generation and controlled use of such extremely high energy levels is a specialized practice and is readily adaptable to commercial industry.

The current state-of-the-art in power generation results in the production of atmospheric pollutants, mainly high levels of nitrogen oxides (NOx), sulfur oxides (SOx), carbon monoxide (CO) and particulate matter. Such emissions are at, and in a great many cases above, critical allowed threshold levels and must be reduced to preserve clean air. Current US regulatory requirements prescribe the amounts of the above listed atmospheric emissions permitted in particular locations by a given power generating plant. Allowable emission threshold are decreasing over time putting more and more pressure on industry to reduce emissions. Drastic economic penalties are being established, either in the form of fines (called purchased credits) related to the amounts by which emissions exceed allowable limits, or plants can be ordered to cease emitting operations.

In addition to the undesired effects of the build-up of atmospheric pollutants on the quality of the environment, current art extracts further societal prices in terms of the added costs of pollution control and monitoring equipment, and the purchasing of credits which are passed on to the consumers.

There have been many efforts to solve the emissions problem by exploiting non-combustible energy sources, such as windmills, fuel cells, solar cells, closed cycle solar reflector/boilers, use of tidal motion and others. None of these sources can approach the required output levels in a cost-effective manner, with operating efficiency required for large-scale, sustained commercial applications currently supplied by the conventional thermal power generating plants. Nuclear plants can produce at the required levels of out-puts, but they have encountered regulatory requirements leading to high costs, and there is a strong societal opposition to increasing use of nuclear power. Hence nuclear power use in the United States is severely restricted.

SUMMARY OF THE INVENTION

This invention is a unique, well developed technology for a high temperature, high pressure combustion device, designed to produce and control an efficient, high energy fluid stream, without generating unacceptable pollution, and which is usable in a variety of embodiments described in this application. The thermo-mechanical design and physical conformation are specific features the purposes of which are efficient operation, pollution avoidance, long life and minimum maintenance. These results are accomplished through unique integration of a number of advanced combustion technologies using selected reactants in a water cooled device generating a high purity steam and carbon dioxide working gas.

Elements of prior specialized technologies are adapted and combined in the design of a thermal power generating plant which can operate cleanly using any of several relatively inexpensive and widely available reactants including liquid oxygen, propane, methane, natural gas, or light alcohols such as ethanol and methanol. These reactants are or can be placed in mass commercial production and distribution, being already in extensive use in other fields such as home heating, cooking, industrial heating, metal cutting and welding, aerospace propulsion applications and others. Further, these reactants can be burned at high temperatures, in high pressure combustors which, while not currently widely used in the power industry, are a practiced art in the aerospace industries, but without emphasis on environmentally clean operation in those applications.

In this invention, the combustor is a high energy, continuous flow device. The liquid reactants are injected into a combustion chamber, via an efficient, high performance, specialized injection device, under high pressure, generating high temperature gas.

In combusting any of the fuels with liquid oxygen, under controlled conditions (i.e., combustor pressure, temperature and fuel/oxidizer mixture ratio) the products of combustion are high pressure, high temperature steam and gaseous carbon dioxide, with virtually no NOx, SOx, CO or particulates generated, depending upon the purity of the fuels and oxidizers used, and the controls of the combustion process. The carbon dioxide product can be recovered during the steam condensing process for commercial use. Current costs of the fuel elements generated in bulk by existing, large scale production facilities, are relatively cost competitive with coal and oil. The energy release in an appropriately scaled reactor produces power at a cost that is competitive with current thermal plants, yet this invention will not yield the massive amounts of polluting gases, thus avoiding the additional penalty costs of pollution control equipment and purchased credits for excess emissions.

A specially configured version of this invention takes the form of a source of a high quality fluid, which can either improve a number of existing commercial applications (e.g. food processing, materials sterilization, oil well injection, etc.), or enable new applications such as intermediately scaled mobile plants for temporary, on-site power support, or non-polluting, steam powered drive systems for large locomotion systems such as trains or ships.

DETAILED DESCRIPTION OF THE PREFERRED EMBODIMENTS

Figure 1:
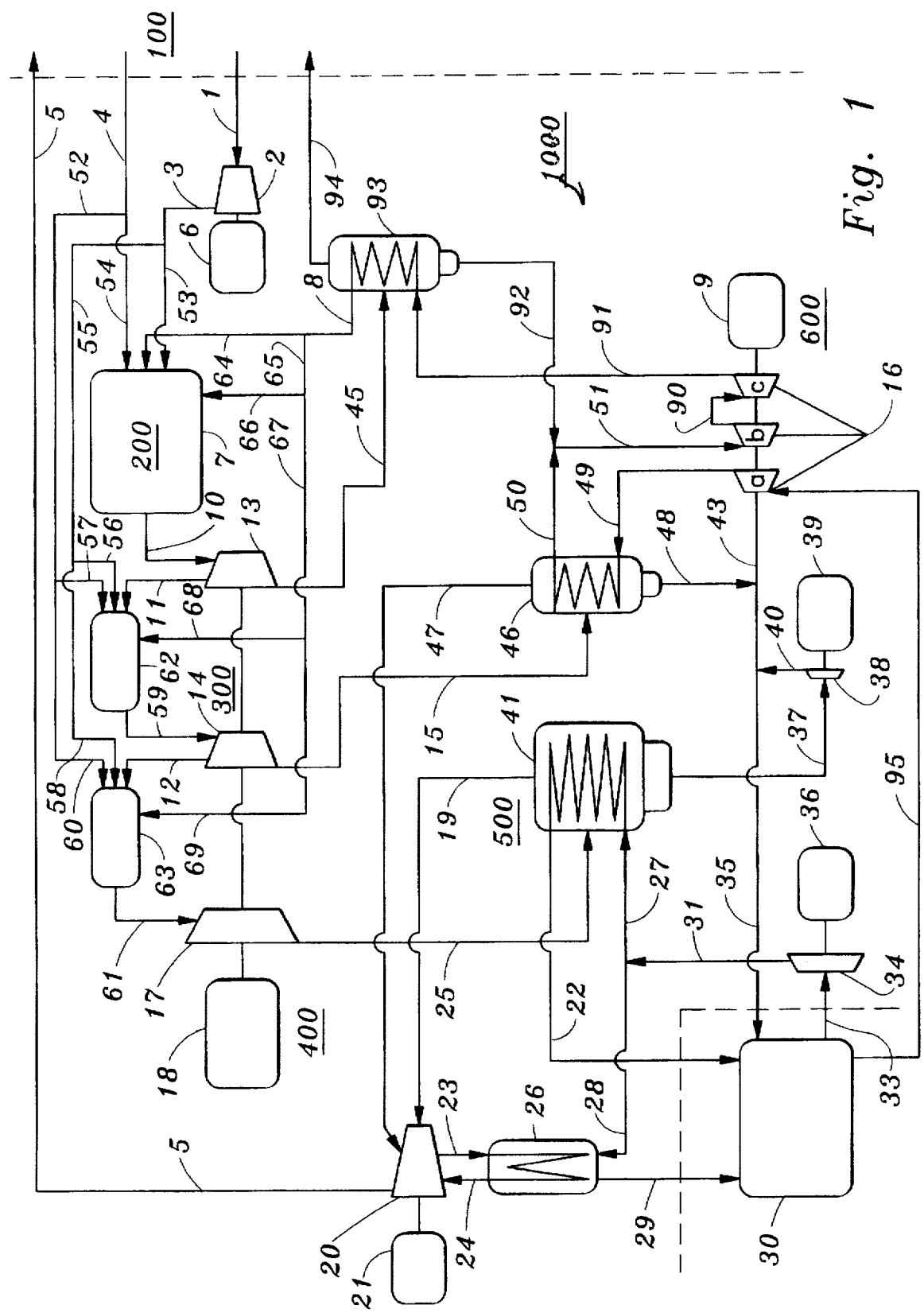
FIG. 1 is a schematic showing an embodiment of the invention, its elements and connectivity that constitute an efficient, pollution-free power generation system. Liquid reactants are shown being introduced to the system from sources that may be either on-site or adjacent production facilities, or from storage facilities. This embodiment features system enhancing elements which maximize energy utilization and minimize component size through turbine drive gas regeneration and inter-turbine drive gas reheating.

FIG. 1. Power generation System with Reheaters and Regenerators

FIG. 1 illustrates a non-polluting, efficient electrical energy generating power plant 1000, comprising a reactant induction subsystem 100, a gas generation subsystem 200, a reheated turbine drive subsystem 300, an electrical energy generation subsystem 400, an exhaust management subsystem 500, and a regenerated water management subsystem 600.

The reactant service subsystem 100 feeds and controls the flow of the fuel and oxidizer reactants that power this system. This includes a liquid oxygen (LOX) feed line 1, feeding the LOX pump 2, which is powered by drive unit 6. The LOX pump 2 delivers high pressure LOX to the system gas generator subsystem 200, via the discharge line 3. High pressure gaseous or liquid fuel is delivered to the gas generator subsystem 200 through feed line 4.

The drive gas generator subsystem 200 includes a gas generator 7, which efficiently combusts the injected reactants under controlled conditions, producing a high pressure, high temperature gaseous mixture of steam and carbon dioxide which is delivered as a turbine drive gas. The drive gas is delivered to the high pressure turbine drive 13, in subsystem 300, via discharge line 10. Thermal control of the combustion process can be accomplished by controlling cooling water flow rate to the gas mixing chamber and to the chamber structure via water feed lines 64 and 66, supplied by water service feed line 65, from the water management subsystem 600.

The turbine drive subsystem 300, converts the gas generator subsystem 200 output energy into mechanical energy to drive the electrical generator subsystem 400. The turbine subsystem 300, consists of three power turbines, pressure staged for optimum efficiency, and two inter-turbine reheater units to maximize the energy in the drive gas.

The turbine drive subsystem 300 consists of high pressure power turbine 13, high pressure power turbine exhaust line 11, and high pressure power tap-off line 45. This assembly is followed by an inter-turbine reheater in which the exhaust temperature is brought back to that at the gas generator outlet by combusting the proper amount of the reactants in the reheater chamber and mixing the output with the main flow stream, thus adding energy and maintaining constant inlet temperature going into the next turbine. This takes place in the first inter-turbine reheater 62, which consists of the reheater 62, and reheater LOX feed line 56, reheater fuel feed line 57, reheater water feed line 68, high pressure turbine steam exhaust from line 11, and reheater discharge line 59. This section is followed by a medium pressure range power turbine 14, medium pressure power turbine discharge line 12, medium power turbine tap-off line 15, followed by the second reheater unit consisting of inter-turbine reheater 63, reheater LOX feed line 58, reheater fuel feed line 60, reheater water feed line 69, medium pressure turbine steam exhaust from line 12, and reheater discharge line 61. The turbine power section is terminated by a low pressure power turbine 17, and discharge line 25, which sends the gas flow to an exhaust recovery condenser 41, in the exhaust recovery subsystem 500.

The energy generation subsystem 400 is the electrical energy conversion facility 18, consisting of electrical generator(s), and power conditioning, which develop the end product of this plant, electrical energy.

The exhaust management subsystem 500 is a gas handling subsystem with two purposes: (i) to make the most efficient use of the exhaust products, and (ii) to verify that pollution controls are effective. This subsystem consists of a carbon dioxide recovery branch and a water recovery branch, both serviced by the heat rejection facility 30.

The carbon dioxide recovery assembly receives near ambient temperature, gaseous carbon dioxide ($CO_2$) from the condenser 41, via discharge line 19, and from the water management subsystem 600, via discharge line 47, into compressor 20, which is powered by drive unit 21. After one stage of compression, the gas is delivered to a water cooler 26, via discharge line 23, and, after cooling by passage through the heat exchanger section of the cooler vessel 26, the fluid is returned to compressor 20, via return line 24, and further compressed before discharge to facility return line 5, for recovery processing. Cooling water is supplied to cooler 26, from the heat rejection facility 30, by cooling water pump 34, powered by drive unit 36. Cooling water is drawn through inlet line 33, and delivered through pump discharge line 31, and cooler inlet line 28. After passing through the heat exchanger element in cooler 26, the cooling water is returned to the heat rejection facility 30, via discharge line 29. Carbon dioxide is also recovered from preheater 93 via discharge line 94.

The water recovery branch consists of the condenser vessel 41, cooling water inlet line 27, which sends cooling water through the condenser 41 heat exchanger section to cool down and condense the exhausted steam back to water. The cooling water is then returned to the heat rejection facility 30, via cooling water outlet line 22, and the condensed water is returned to the water management subsystem 600, via discharge line 37.

The water management subsystem 600 maintains the proper water balance in the operating system 1000. It does this by maintaining the proper cooling water injected at the gas generator inlet. The major product of combustion, using the reactants intended for this system, is water, therefore following start-up there is more than enough water available to operate the system. However, to insure adequate water availability during start-up, shut-down, and other transient operations, the heat rejection facility will serve as a reservoir as well as a receiver for any excess water generated. The main elements in the embodiment of the water management subsystem 600 are pressure staged pumps 16a, 16b, and 16c, powered commonly by drive unit 9, condensate pump 38, powered by drive unit 39, and two (2) performance enhancing regenerator units 46 and 93.

The water recovered in the exhaust management subsystem 500 is returned to the water supply from condenser 41, discharge line 37, to condensate water pump 38, which is powered by drive unit 39. Condensate water pump 38 delivers the water to the feed water pumping system via discharge line 40. Excess water is diverted to the heat rejection facility 30, via return line 35, or any required start-up or make-up water is drawn from the heat rejection facility 30, via inlet line 95 and delivered to the inlet of pump 16a. The main water flow is delivered to the feed water pumps 16a, 16b, and 16c by the condensate pump 38, via feed line 43, which is joined by a recirculated flow from the medium pressure turbine tap-off line 15. This tap-off flow serves as the heat source in the heat exchange element of a regenerator device, regenerator 46, to conserve heat energy. The tap-off flow is collected in a sump in regenerator 46, and discharges to the low pressure feed water pump 16a, via discharge line 48, of regenerator 46 and pump 16ainlet line 43. An initial stage of feed water pressurization is accomplished in low pressure feed water pump 16a. The outflow of pump 16a is carried to regenerator 46, via discharge line 49, picks up heat energy in the heat exchanger element in regenerator 46, and then is passed to the medium pressure feed water pump 16b, via heat exchanger outlet line 50 and through inlet line 51. The water flow is joined by a recirculated flow that originates from the high pressure power turbine tap-off line 45. This tap-off flow serves as the heat source in the heat exchange element of the regenerator 93, to further conserve heat energy. The tap-off flow is collected in a sump in regenerator 93, and discharges to the medium pressure feed water pump 16b, via sump discharge line 92, of regenerator 93, and through medium pressure pump inlet line 51. The feed water flow stream is passed to the high pressure pump 16c, via medium pressure feed water pump 16b's discharge line 90. The high pressure pump 16craises the main stream water pressure to the design level then discharges it via discharge line 91, to the heat exchanger section of regenerator 93, where it picks up more heat energy before finally being passed to the gas generator subsystem 200, and the reheaters 62 and 63, in the power turbine subsystem 300, via discharge line 8, and reheater cooling water line 65. The feed water pumps 16a, 16band 16c are powered by the common drive unit 9.

Figure 2:
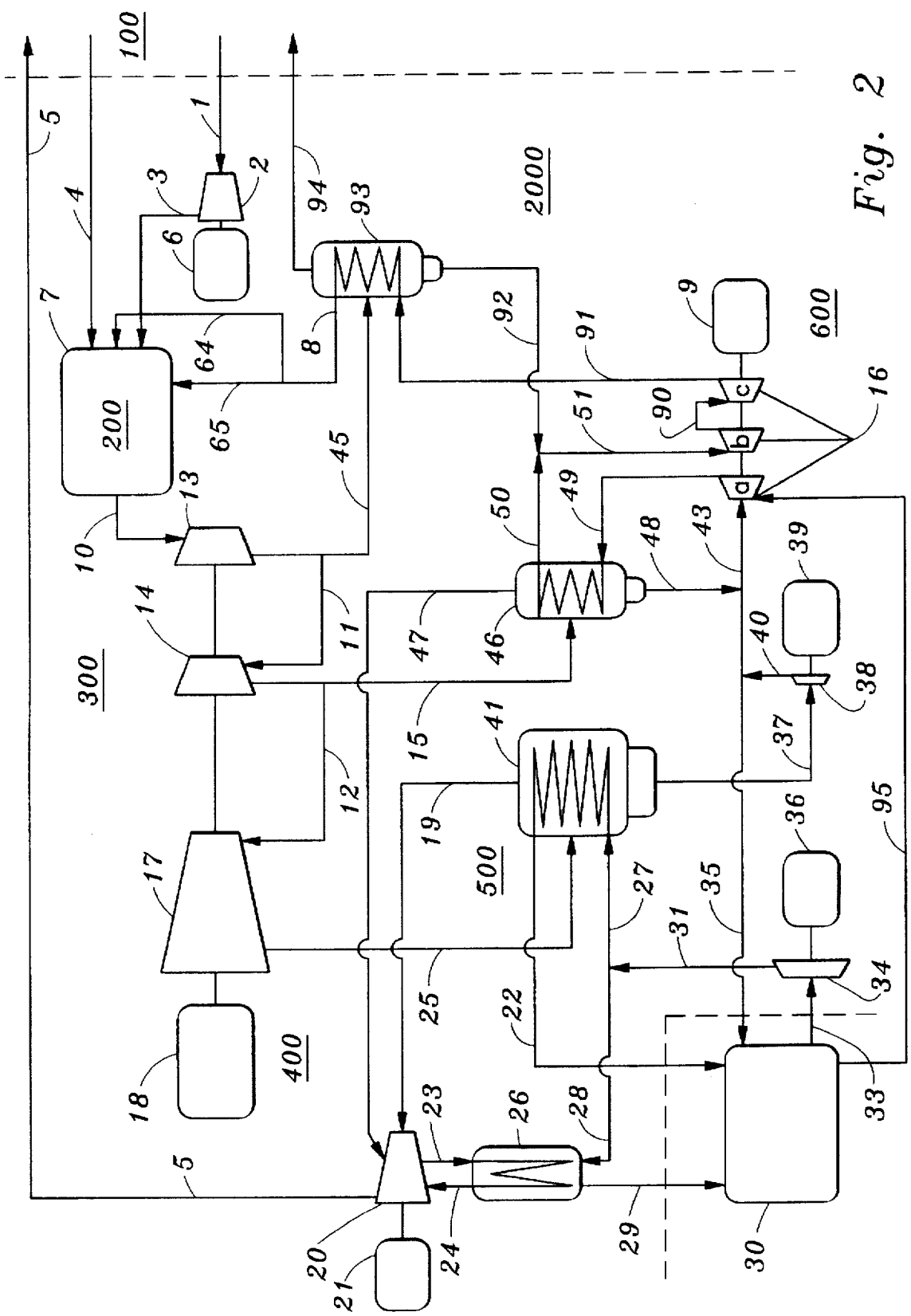
FIG. 2 is a schematic showing an embodiment of the system from which the inter-turbine reheaters were removed, which simplifies the system of FIG. 1, reduces cost, and slightly increases performance, but at the expense of increased component sizes and weights.

FIG. 2. Power Generation System with Regenerators

FIG. 2 illustrates a non-polluting electrical energy generating plant 2000, comprising a reactant induction subsystem 100, a gas generation subsystem 200, a turbine drive subsystem 300, an electrical energy generation subsystem 400, an exhaust management subsystem 500, and a regenerated water management subsystem 600.

The reactant service subsystem 100 feeds and controls the flow of the fuel and oxidizer reactants that power this system. This includes a liquid oxygen (LOX) feed line 1, feeding the LOX pump 2, which is powered by drive unit 6. The LOX pump 2 delivers high pressure LOX to the system gas generator subsystem 200, via the discharge line 3. High pressure gaseous or liquid fuel is delivered to the gas generator subsystem 200 through feed line 4.

The drive gas generator subsystem 200 includes a gas generator 7, which efficiently combusts the injected reactants under controlled conditions, producing a high pressure, high temperature gaseous mixture of steam and carbon dioxide which is delivered as a turbine drive gas. The drive gas is delivered to the turbine drive subsystem 300, via discharge line 10. Thermal control of the combustion process can be accomplished by controlling cooling water flow rate to the gas mixing chamber and to the chamber structure via water feed lines 64, supplied by water service feed line 65, which also feeds cooling water to the gas generator subsystem 200, from the water management subsystem 600.

The unreheated turbine drive subsystem 300, converts the gas generator subsystem 200 output energy into mechanical energy to drive the electrical generator subsystem 400. The turbine subsystem consists of three power turbines, pressure staged for optimum efficiency.

The turbine drive subsystem 300 consists of high pressure power turbine 13, high pressure power turbine exhaust line 11, and high pressure power tap-off line 45. This assembly is followed by a medium pressure power turbine 14, medium pressure power turbine discharge line 12, and medium power turbine tap-off line 15. The turbine power subsystem 300 is terminated by a low pressure power turbine 17, and discharge line 25, which sends the gas flow to an exhaust recovery condenser 41, in the exhaust recovery subsystem 500.

The energy generation subsystem 400 is the electrical energy conversion facility 18, consisting of electrical generator(s), and power conditioning, which develop the end product of this plant, electrical energy.

The exhaust management subsystem 500 is a gas handling subsystem with two purposes: (i) to make the most efficient use of the exhaust products, and (ii) to verify that pollution controls are effective. This subsystem consists of a carbon dioxide recovery branch and a water recovery branch, both serviced by heat rejection facility 30.

The carbon dioxide recovery assembly receives near ambient temperature, gaseous carbon dioxide ($CO_2$) from the condenser 41, via discharge line 19, and from the water management subsystem 600, via regenerator 46 $CO_2$ gas discharge lines 47, into compressor 20, which is powered by drive unit 21. After a stage of compression, the gas is delivered to a water cooled heat exchanger in cooler unit 26, via discharge line 23. After cooling by passage through the cooler vessel 26, the fluid is returned to the compressor 20, via return line 24, and further compressed before discharge to facility return line 5, for recovery processing. Cooling water is supplied to the cooler 26, from the heat rejection facility 30, by cooling water pump 34, powered by drive unit 36. Cooling water is drawn through inlet line 33, and delivered through pump discharge line 31, and cooler inlet line 28. After passing through the heat exchanger element in cooler 26, the cooling water is returned to the heat rejection facility 30, via discharge line 29. Carbon dioxide is also recovered from preheater 93 via discharge line 94.

The water recovery branch consists of the condenser vessel 41, cooling water inlet line 27, which sends cooling water through the condenser 41 heat exchanger section to cool down and condense the exhausted steam back to water. The cooling water is then returned to the heat rejection facility 30, via cooling water outlet line 22, and the condensed water is returned to the water management subsystem 600, via discharge line 37.

The water management subsystem 600 maintains the proper water balance in the operating system 2000. It does this by maintaining the proper cooling water injected at the gas generator inlet. The major product of combustion, using the reactants intended for this system, is water, therefore following start-up there is more than enough water available to operate the system. However, to insure adequate water availability during start-up, shut-down, and other transient operations, the heat rejection facility will serve as a reservoir as well as a receiver for any excess water generated. The main elements in the embodiment of the water management subsystem 600 are pressure staged pumps 16a, 16b, and 16c, driven commonly by drive unit 9, two (2) performance enhancing regenerator units 46 and 93, and a condensate pump 38, powered by drive unit 39.

The water recovered in the exhaust management subsystem 500 is returned to the water supply from condenser 41, via discharge line 37, to condensate water pump 38, which is powered by drive unit 39. Condensate water pump 38 delivers the water to the feed water pumping system via discharge line 40. Excess water is diverted to the heat rejection facility 30, via return line 35, or any required start-up or make-up water is drawn from the heat rejection facility 30, via inlet line 95 and delivered to the inlet of water pump 16a. The main water flow is delivered to the feed water pumps 16a, 16b and 16c by the condensate pump 38, via feed line 43, which is joined by a recirculated flow from the medium pressure turbine tap-off line 15. This tap-off flow serves as the heat source in the heat exchange element of regenerator 46, to conserve heat energy. The tap-off flow is collected in a sump in regenerator 46, and discharges to the low pressure feed water pump 16a, via discharge line 48, of regenerator. 46 and pump 16a inlet line 43. An initial stage of feed water pressurization is accomplished in low pressure feed water pump 16a. The outflow of pump 16a is carried to regenerator 46, via discharge line 49, picks up heat energy in the heat exchanger element in regenerator 46, and then is passed to the medium pressure feed water pump 16b, via regenerator 46 discharge line 50, through inlet line 51. The water flow is joined by a recirculated flow that originates from the high pressure power turbine tap-off line 45. This tap-off flow serves as the heat source in the heat exchange element of the regenerator 93, to further conserve heat energy. The tap-off flow is collected in a sump in regenerator 93, and discharges to the medium pressure feed water pump 16b, via sump discharge line 92, of regenerator 93, and through medium pressure pump inlet line 51. The feed water flow stream is passed to the high pressure pump 16c, via medium pressure feed water pump 16b's discharge line 90. The high pressure pump 16c raises the main stream water pressure to the design level then discharges it via discharge line 91, to the heat exchanger section of regenerator 93, where it picks up more heat energy before finally being passed to the gas generator subsystem 200, via discharge line 8, and cooling water lines 64 and 65. The feed water pumps 16a, 16b and 16c are powered by the common drive unit 9.

Figure 3:
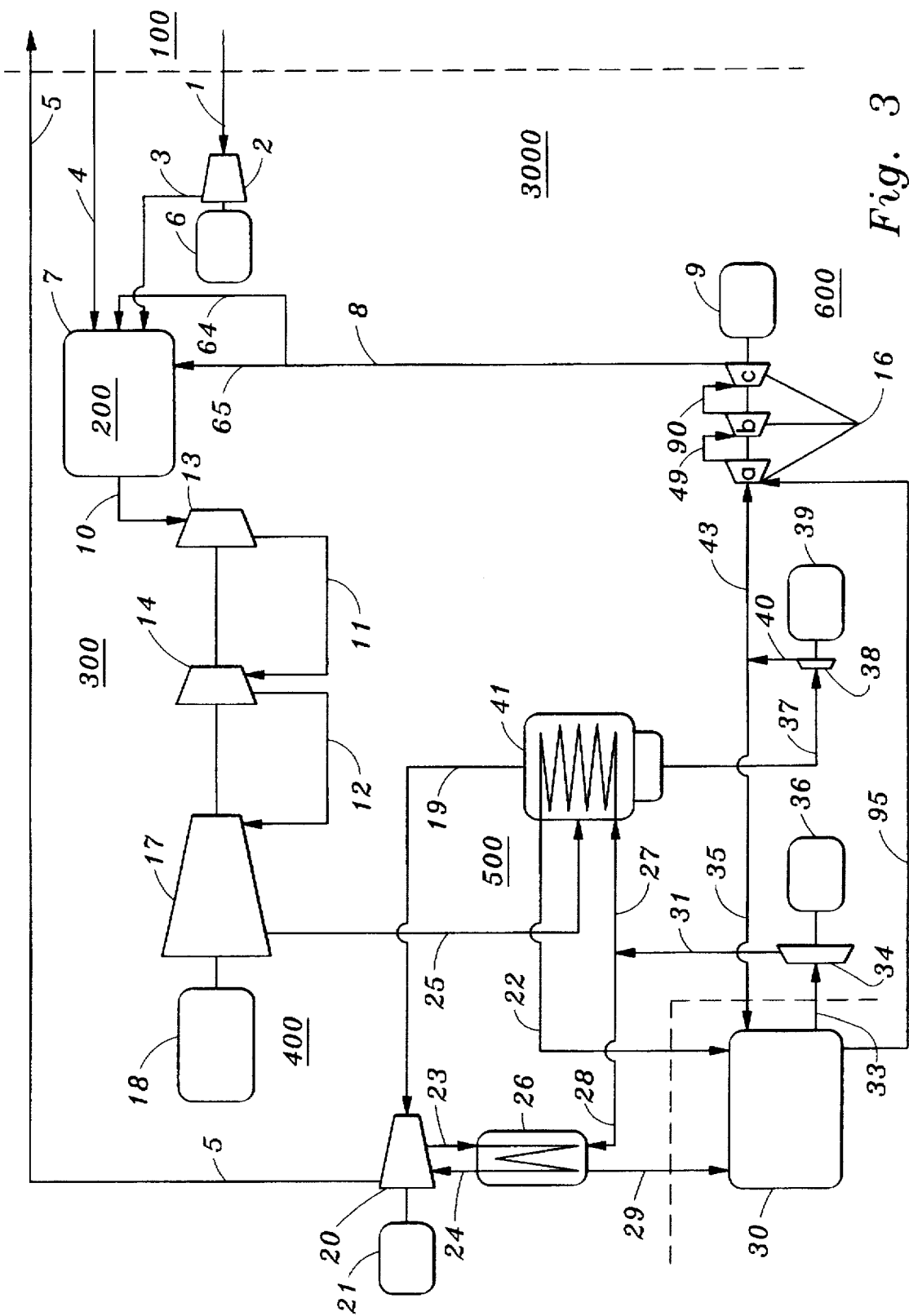
FIG. 3 is a schematic showing an embodiment of the system from which both the reheaters and regenerators were removed, which simplifies the system of FIG. 2, further reduces cost and decreases system performance, but at the expense of further increased component sizes and weights.

FIG. 3. Baseline Power Generation System

FIG. 3 illustrates a non-polluting, efficient electrical energy generating power plant 3000, comprising a reactant induction subsystem 100, a gas generation subsystem 200, a turbine drive subsystem 300, an electrical energy generation subsystem 400, an exhaust management subsystem 500, and an unregenerated water management subsystem 600.

The reactant service subsystem 100 feeds and controls the flow of the fuel and oxidizer reactants that power this system. This includes a liquid oxygen (LOX) feed line 1, feeding the LOX pump 2, which is powered by drive unit 6. The LOX pump 2 delivers high pressure LOX to the system gas generator subsystem 200, via the discharge line 3. High pressure gaseous or liquid fuel is delivered to the gas generator subsystem 200 through feed line 4.

The drive gas generator subsystem 200 includes a gas generator 7, which efficiently combusts the injected reactants under controlled conditions, producing a high pressure, high temperature gaseous mixture of steam and carbon dioxide which is delivered as a turbine drive gas. The drive gas is delivered to the turbine drive subsystem 300, via discharge line 10. Thermal control of the combustion process can be accomplished by controlling cooling water flow rate to the gas mixing chamber and to the chamber structure via water feed lines 64 and 65, from the water management subsystem 600.

The turbine drive subsystem 300, converts the gas generator subsystem 200 output energy into mechanical energy to drive the electrical generator subsystem 400.

The turbine subsystem consists of three power turbines, pressure staged for optimum efficiency. The turbine drive subsystem 300 consists of high pressure power turbine 13, and high pressure power turbine exhaust line 11. This assembly is followed by a medium pressure power turbine 14, and medium pressure power turbine discharge line 12. The turbine power subsystem 300 is terminated by a low pressure power turbine 17, and discharge line 25, which sends the gas flow to an exhaust recovery condenser 41, in the exhaust recovery subsystem 500.

The energy generation subsystem 400 is the electrical energy conversion facility 18, consisting of electrical generator(s), and power conditioning, which develop the end product of this plant, electrical energy.

The exhaust management subsystem 500 is a gas handling subsystem with two purposes: (i) to make the most efficient use of the exhaust products, and (ii) to verify that pollution controls are effective. This subsystem consists of a carbon dioxide recovery branch and a water recovery branch, both serviced by a heat rejection facility 30.

The carbon dioxide recovery assembly receives near ambient temperature, gaseous carbon dioxide (CO2) from condenser 41, via discharge line 19, into compressor 20, which is powered by drive unit 21. After one stage of compression, the gas is delivered to a water cooled heat exchanger in cooler unit 26, via discharge line 23. After cooling by passage through the cooler vessel 26, the fluid is returned to the compressor 20, via return line 24, and further compressed before discharge to facility return line 5, for recovery processing. Cooling water is supplied to the cooler 26, from the heat rejection facility 30, by cooling water pump 34, powered by drive unit 36. Cooling water is drawn through inlet line 33, and delivered through pump discharge line 31, and cooler inlet line 28. After passing through the heat exchanger element in cooler 26, the cooling water is returned to the heat rejection facility 30, via discharge line 29.

The water recovery branch consists of the condenser vessel 41, cooling water inlet line 27, which sends cooling water through the condenser 41 heat exchanger section to cool down and condense the exhausted steam back to water. The cooling water is then returned to the heat rejection facility 30, via cooling water outlet line 22, and the condensed water is returned to the water management subsystem 600, via discharge line 37.

The water management subsystem 600 maintains the proper water balance in the operating system 3000. It does this by maintaining the proper cooling water injected at the gas generator inlet. The major product of combustion, using the reactants intended for this system, is water, therefore following start-up there is more than enough water available to operate the system. However, to insure adequate water availability during start-up, shut-down, and other transient operations, the heat rejection facility will serve as a reservoir as well as a receiver for any excess water generated. The main elements in the embodiment of the water management subsystem 600 are pressure staged pumps 16a, 16b, and 16c, powered commonly by drive unit 9, and a condensate pump 38, driven by drive unit 39.

The water recovered in the exhaust management subsystem 500 is returned to the system water supply from condenser 41, discharge line 37, to condensate water pump 38, which is powered by drive unit 39. Condensate water pump 38 delivers the water to the feed water pumping system via discharge line 40. Excess water is diverted to the heat rejection facility 30, via return line 35, or any required start-up or make-up water is drawn from the heat rejection facility 30, via inlet line 95 and delivered to the inlet of water pump 16a. The main water flow is delivered to feed water pumps 16a, 16b and 16c. The condensate pump 38, sends the recovered water to the low pressure feed water pump 16a, via feed line 43. Initial feed water pressurization is accomplished in low pressure feed water pump 16a. The outflow of pump 16a is carried to medium pressure feed water pump 16b by feed water line 49. The medium pressure feed water pump 16b raises the feed water pressure further and passes the feed water flow stream to the high pressure pump 16c, via feed water line 90. The high pressure pump 16c raises the main stream water pressure to the design level before finally being passed to the gas generator subsystem 200 via discharge line 8 and inlet water lines 64 and 65.

Figure 4:
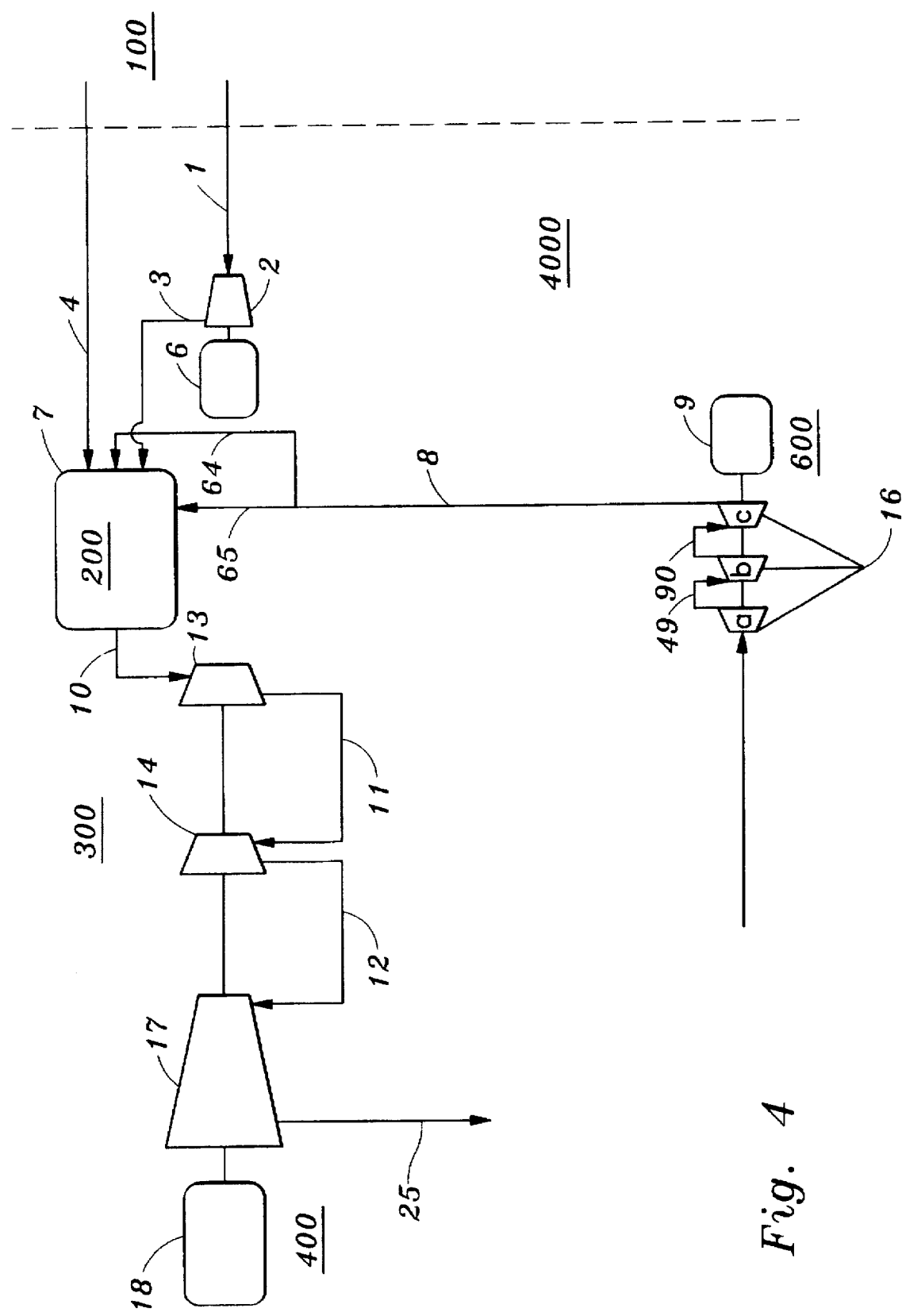
FIG. 4 is a schematic showing an adaptation of embodiment 3, from which the recirculating water circuit and customer supplied heat rejection system were eliminated, with water supplied from a source (e.g., lake, river, or purified sea water), thus eliminating the complexity and cost of the closed loop water recovery and heat rejection subsystems.

FIG. 4. Simplified Power Generation System

FIG. 4 illustrates a minimum polluting, efficient electrical energy generating power plant 4000, comprising a reactant induction subsystem 100, a gas generation subsystem 200, a turbine drive subsystem 300, an electrical energy generation subsystem 400, and a limited water management subsystem 600. The limited exhaust gas management subsystem 500 is eliminated in this embodiment. This embodiment has a reduced complexity, hence reduced costs, for both acquisition and maintenance.

The reactant service subsystem 100 feeds and controls the flow of the fuel and oxidizer reactants that power this system. This includes a liquid oxygen (LOX) feed line 1, feeding the LOX pump 2, which is powered by drive unit 6. The LOX pump 2 delivers high pressure LOX to the system gas generator subsystem 200, via the discharge line 3. High pressure gaseous or liquid fuel is delivered to the gas generator subsystem 200 through feed line 4.

The drive gas generator subsystem 200 includes a gas generator 7, which efficiently combusts the injected reactants under controlled conditions, producing a high pressure, high temperature gaseous mixture of steam and carbon dioxide which is delivered as a turbine drive gas. The drive gas is delivered to the turbine drive subsystem 300, via discharge line 10. Thermal control of the combustion process can be accomplished by controlling cooling water flow rate to the gas mixing chamber and to the chamber structure via water feed lines 64 and 65. This embodiment is suited for sites where water availability makes the complexity and cost of a water recovery system unnecessary.

The turbine drive subsystem 300, converts the gas generator subsystem 200 output energy into mechanical energy to drive the electrical generator subsystem 400. The turbine subsystem consists of three power turbines, pressure staged for optimum efficiency.

The turbine drive subsystem 300 consists of high pressure power turbine 13, and high pressure power turbine exhaust line 11. This assembly is followed by a medium pressure power turbine 14, and medium pressure power turbine discharge line 12. The turbine power subsystem 300 is terminated by a low pressure power turbine 17, and discharge line 25, which discharges the exhaust to the atmosphere.

The energy generation subsystem 400 is the electrical energy conversion facility 18, consisting of electrical generator(s), and power conditioning, which develop the end product of this plant, electrical energy.

In this embodiment the exhaust management subsystem 500 is deleted and the low pressure turbine exhaust gases are vented to the atmosphere.

For this embodiment the water management subsystem 600 draws cooling water from a nearby water source. The main elements in this embodiment of water management subsystem 600 are pressure staged pumps 16a, 16b, and 16c, powered commonly by drive unit 9. The water flow is drawn by the feed water pumps 16a, 16b, and 16c, through intake line 43. The initial stage of feed water pressurization is accomplished in low pressure feed pump 16a. The out-flow of pump 16a is carried via discharge line 49, to the medium pressure feed water pump 16b. From medium pressure feed pump 16b, the feed water flow stream is passed to the high pressure pump 16c, via medium pressure feed water pump 16b's discharge line 90. The high pressure pump 16c raises the main stream water pressure to its design level and delivers the water to the gas generator subsystem 200 via discharge line 8 and cooling water lines 64 and 65.

Figure 5:
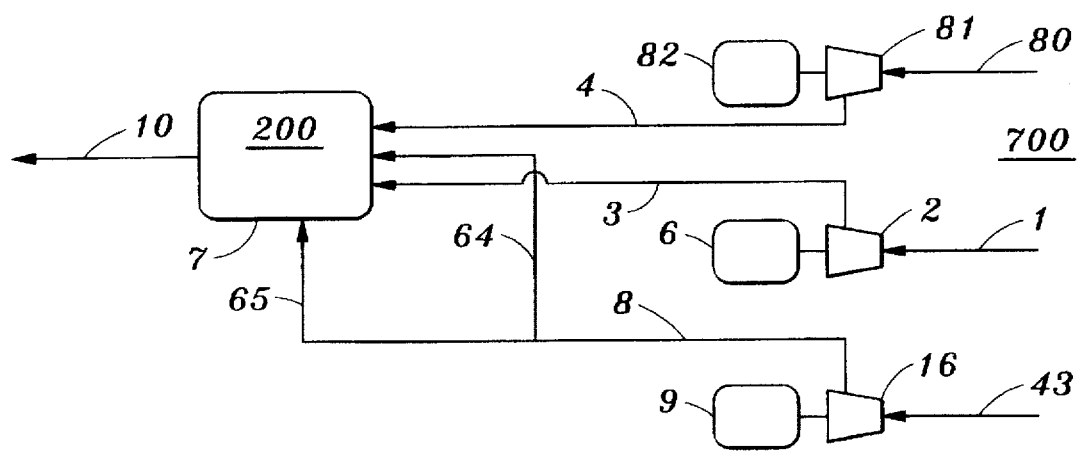
FIG. 5 is an illustration of an embodiment of the basic concept which uses those elements of the system required to generate the drive gas only. The generation of the high pressure, high temperature, high purity steam and carbon dioxide mixture that this system is capable of delivering has multiple industrial applications (e.g's., oil well injection, material sterilization, or heating of large structures or building complexes, and others).

FIG. 5. High Pressure Steam/CO2 Generation System

FIG. 5 illustrates a non-polluting, high energy industrial fluid generation plant 5000, comprising a reactant service subsystem 700, and a gas generation subsystem 200.

The reactant service subsystem 700 feeds and controls the flow of fuel and oxidizer reactants that power this system.

This includes a liquid oxygen inlet line 1, feeding a high pressure LOX pump 2, driven by drive unit 6. The LOX pump 2, delivers high pressure LOX to the gas generator subsystem 200, via the pump discharge line 3. Inlet line 80 feeds liquid fuel to high pressure pump 81, which is powered by drive unit 82. Pump 81 delivers high pressure fuel to the gas generator subsystem 200 via discharge line 4. Inlet line 43 delivers cooling feed water to the high pressure pump 16, which is powered by drive unit 9. The high pressure cooling water is delivered to the gas generator subsystem 200 via pump discharge line 8. This flow is split at line 8 outlet into cooling water for delivery to the gas generator 200's internal combustor chamber cooling via feed line 64, and to the internal gas-water mixing chamber section via inlet line 65.

The drive gas generator subsystem 200 includes a gas generator 7, Which combusts the injected reactants under controlled conditions, producing a high pressure, high temperature gaseous mixture of steam and-carbon dioxide, a high energy fluid suitable for a wide range of industrial applications, via discharge line 10. Thermal control of the combustion process is accomplished by controlling cooling water flow rate to an internal combustion chamber and to the gas-water mixing chamber via water feed lines 64 and 65.

Figure 6:
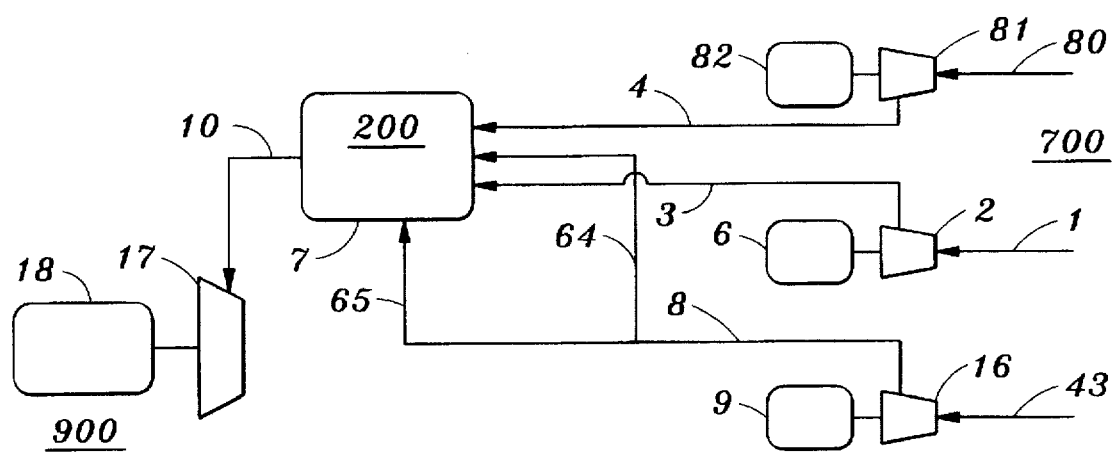
FIG. 6 is an illustration of an embodiment that is a modification of FIG. 5, wherein the gas generator output is used to power a turbogenerator set, with components sized to mount on a mobile platform for applications such as remote site construction or exploration, auxiliary or peaking power supply, service power, or large locomotive drive applications, such as for trains or ships.

FIG. 6. Auxiliary/Transportation Power Generation System

FIG. 6 illustrates a non-polluting, efficient, auxiliary and/ or transportation power system 6000. This embodiment augments embodiment 5000, subsystems 700 and 200 with an energy conversion subsystem 900, to produce a power system that can be scaled in size to a wide spectrum of industrial applications (e.g's., stand-by emergency power, peaking power, portable remote site power, nonpolluting steam train power, ocean-going vessels, and many other similar applications).

The reactant service subsystem 700 feeds and controls the flow of fuel and oxidizer reactants that power this system and the gas generator subsystem 200 cooling water. This includes a liquid oxygen inlet line 1, feeding a high pressure LOX pump 2, which is driven by drive unit 6. The LOX pump 2 delivers high pressure LOX to the gas generator subsystem 200, via the pump discharge line 3. Inlet line 80 feeds liquid fuel to high pressure pump 81, which is powered by drive unit 82. Pump 81 delivers high pressure fuel to the gas generator subsystem 200 via discharge line 4. Inlet line 43 delivers cooling feed water to the high pressure pump 16, which is powered by drive unit 9. The high pressure cooling water is delivered to the gas generator subsystem 200 via pump discharge line 8.

The drive gas generator subsystem 200 includes a gas generator 7, which combusts the injected reactants under controlled conditions, producing a high pressure, high temperature gaseous mixture of steam and carbon dioxide, a high energy drive fluid delivered to the drive turbine 17, of the energy generation subsystem 900, via discharge line 10. Thermal control is accomplished by controlling cooling water flow rate picked up from discharge line 8 of the reactant service subsystem 700. This flow stream is split and directed to an internal combustion chamber via inlet line 64, and to the main mixing chamber section via water inlet line 65.

The energy generation subsystem 900 is the electrical energy conversion facility power turbine 17, and the electric motor/generator unit 18, which can be harnessed to any number of industrial applications.

Figure 7:
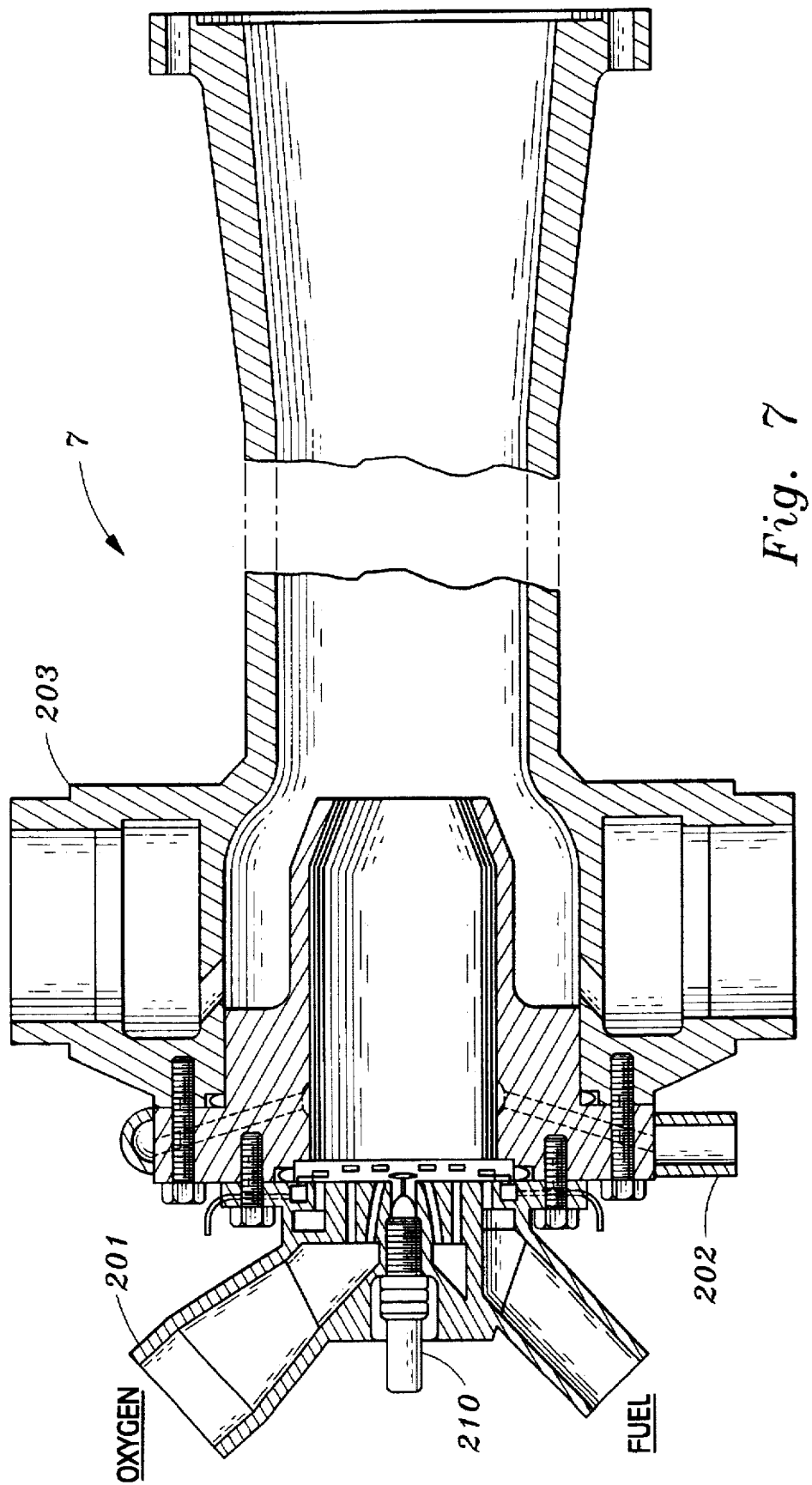
FIG. 7 is a cut-away diagram showing the elements of the main reactor (or gas generator). This illustration shows the functional elements of the device, including the reactants' inlets and manifolds, the injector, the transpiration cooled combustion chamber, and the internal mixing chamber and outlet.

FIG. 7. Gas Generator

FIG. 7 is a cut-away view of a unique, advanced technology combustor device which is the gas generator 7 used to develop the high energy gas used in all the embodiments contained in this application. Its configuration and operation are designed to develop and control the high energy, non-polluting fluid in the most efficient, cost-effective manner. The thermo-mechanical design and physical conformation are specific features the purposes of which are efficient operation, pollution avoidance, long life and minimum maintenance.

The device is composed of a start-up igniter 210, a fluid induction head 201, containing oxygen and gaseous or liquid fuel inlets on a planar face therof and integral distribution channels, the induction head providing the inspiration of fuel and oxygen into the gas generator an injector face water cooling inlet and distribution circuitry, a micro-ported reactant injector body, and a water cooled combustor. The fluid induction head interfaces with an adapter block 202 which contains an inlet and distribution passages to feed cooling water to the wall of the combustor element of the fluid induction head. The adapter block 202 includes a hollow cylindrical shroud having a central axis aligned perpendicular to the planar side of the induction head 201. The cylindrical shroud has a first end adjacent to the induction head 201 and a second end opposite the first end, the second end located free from contact with the walls of the enclosure. The shroud includes a hollow interior and an exterior surface facing away from the hollow interior. The oxygen and fuel inlets are located within the hollow interior. The cooling water inlets are located outside of the of the hollow interior and adjacent the exterior surface of the shroud. The second end of the shroud has tapered throat having a diameter less than a diameter of the tint end of the cylindrical shroud. The adapter block 202 is also the interface to the device mixing chamber 203. The mixing chamber has inlets for the induction of the major portion of the water flow which mixes with the hot gas in the chamber to attain the design drive gas temperature. In addition, the manner in which this flow stream is introduced cools the walls of the mixing chamber, maintaining wall temperature at the design level. The gas generator is comprised of: a means of start-up ignition, using an electrical device to ignite a combustible mixture in a chamber, a means of receiving high pressure liquid oxygen, means for receiving high pressure gaseous or liquid hydrocarbon or simple alcohol fuel, and means for combining said high pressure liquid oxygen and said high pressure gaseous or liquid fuel in a chamber for combustion, including inlet means for said oxygen and said fuel, distribution means for said oxygen and said fuel, a means for metering and mixing said oxygen and said fuel to obtain complete combustion, means of containing the combusted gases in a controlled flow which is treatable, and means of exhaust; a means of introducing into the chamber, a high pressure water flow to cool the chamber walls and to quench the combusted gases being exhausted, including water inlet means, water distribution means, water and gas mixing means, and means for exhaust of a high pressure, high temperature working fluid.

Figure 8:
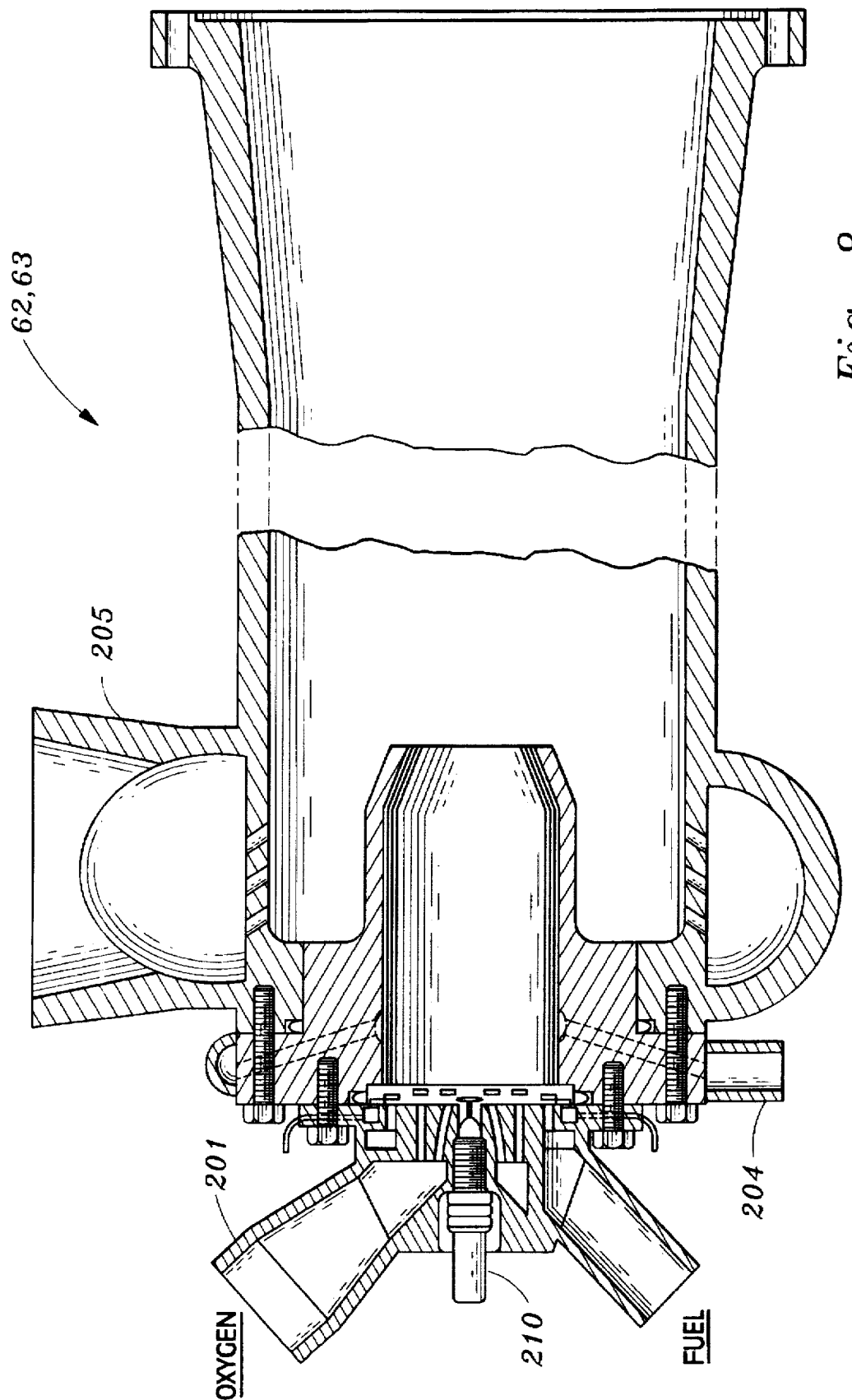
FIG. 8 is a cut-away of a typical inter-turbine reheater. The device is a specialized version of the main reactor. The size of an individual reheater is dependent on the physical state of the out-flow received from the preceding turbine unit.

FIG. 8. Drive Gas Reheater

FIG. 8 is a cut-away view of a unique, advanced technology drive gas reheater 62 63 which can be used to boost the temperature of a drive gas stream after it has passed through an energy extracting device like a power turbine. While this approach to energy management in a power system has a small penalty in overall system efficiency, it allows a reduction in the size and weight of certain components. The thermo-mechanical design and physical conformation are specific features, the purposes of which are efficient operation, long life and minimal maintenance.

The device is composed of the same start-up igniter 40 used in the gas generator, FIG. 7, a fluid management head 201 containing oxygen and fuel inlets and integral distribution channels, an injector face water cooling inlet and distribution circuitry, a micro-ported reactant injector body, and a water cooled combustor. This item is the same as item 202 in the gas generator in FIG. 7. The fluid induction head interfaces with an adapter block 204 which contains an inlet and distribution passages to feed cooling water to the wall of the combustor element of the fluid induction head 201. The adapter block 204 is similarly configured to item 201 in the gas generator device in FIG. 7, except that the outer flange diameter is sized to interface with the gas induction and mixing chamber 205. The mixing chamber has inlets for the induction of the gas flow from the preceding device (e.g., preceding turbine exhaust) and to mix the inducted gas with the hot gas generated in the preheater combustor in item 204. This mixing is done to raise the inducted gas temperature back to the same level it had at the entrance of the preceding device. This element is similar to that in FIG. 7, except that its fore and aft diameters are matched to the preceding and following devices in the total gas flow path, and the inlets induct gas rather than water and are sized accordingly.

What is claimed:

1. A low pollution power generating system comprising in combination:

a source of elevated pressure oxygen, free of nitrogen;

a source of elevated pressure fuel including compounds containing carbon and hydrogen, at least one of the compounds in the fuel including the element carbon;

a source of water, said source of water at least partially including water generated within said system as a product of combustion of the fuel with the oxygen;

a gas generator having a walled enclosure with a center line, said gas generator including at least one fuel inlet passing through a wall of said enclosure and coupled to said source of elevated pressure fuel, at least one oxygen inlet passing through said wall of said enclosure and coupled to said source of elevated pressure oxygen, a means to initiate combustion of said fuel within said generator, a means to combust the fuel with the oxygen to generate a gas consisting of steam and carbon dioxide as products of combustion, at least one water flow inlet coupled to said source of water, said water flow inlet passing through said wall of said enclosure at a location on said wall of said enclosure spaced from said fuel inlet and said oxygen inlet, a mixing chamber oriented within said enclosure wherein products of combustion of the fuel and the oxygen mix with the water from said water flow inlet, and a discharge passing out of said enclosure for a mixture of both the gaseous products of combustion including steam and carbon dioxide produced within said enclosure from reaction of the fuel and the oxygen therein and gaseous phase water within said enclosure and originally provided from said water flow inlet;

wherein said fuel inlet and said oxygen inlet are located within an induction head portion of said enclosure, said induction head having a planar side facing said enclosure, said planar side supporting said fuel inlet and said oxygen inlet;

wherein said planar side of said induction head is perpendicular to a direction of fuel and oxygen flow into said enclosure:

wherein said enclosure includes at least three separate units including said induction head, an adapter block and said mixing chamber;

wherein said discharge is located in said mixing chamber of said enclosure at a location on said mixing chamber most distant from said induction head;

wherein said adapter block includes a hollow cylindrical shroud having a central axis aligned perpendicular to said planar side of said induction head in a position which corresponds with said center line of said enclosure, said cylindrical shroud having a first end adjacent said induction head and a second end opposite said first end, said second end located free from contact with said walls of said enclosure;

wherein said shroud includes a hollow interior and an exterior surface facing away from said hollow interior, said fuel inlet and said oxygen inlet oriented within said hollow interior, said water inlet located outside of said hollow interior and adjacent said exterior surface of said shroud, said second end of said shroud having a tapered throat thereon, said tapered, throat having a diameter less than a diameter of said first end of said cylindrical shroud adjacent said planar side of said induction head;

means to generate power from expansion of said gas exiting said discharge without emission of nitrogen into the environment, said gas having more steam than carbon dioxide, said power generating means operatively coupled to said discharge of said gas generator; and means to separate and collect said steam and carbon dioxide from each other.

2. The system of claim 1 wherein said gas generator includes said wall of said enclosure supporting said oxygen inlet and said fuel inlet adjacent each other and said water flow inlet oriented and supported by said wall of said enclosure at a location between said oxygen inlet and said fuel inlet on a first side and said discharge on a second side, said water flow inlet oriented at a location on said wall of said enclosure that is spaced from said oxygen inlet and, said fuel inlet by a distance sufficient to prevent said fuel from mixing with said water entering said enclosure from said water flow inlet before combusting, and wherein said source of elevated pressure oxygen includes a source of elevated pressure liquid oxygen.

3. The system of claim 2 wherein water distribution circuitry is coupled to said source of water and oriented on said wall of said enclosure at a location adjacent said fuel inlet and said oxygen inlet, and sufficiently close to said oxygen inlet and said fuel inlet to cause contact between the reactants and the water.

4. The system of claim 2 wherein said water distribution circuitry includes a water cooling inlet passing through an injector face forming a portion of said wall of said enclosure supporting said fuel inlet and said oxygen inlet, said water cooling inlet directing water into said enclosure at a location adjacent said oxygen inlet and said fuel inlet.

5. The system of claim 4 wherein said separation means includes a condenser, said condenser located downstream from said discharge to receive gas exiting said discharge and including means to condense water from said gas exiting said discharge, and means to collect any gaseous products of combustion from said gas generator.

6. The system of claim 5 wherein said power generating means is at least one turbine coupled to an electric generator, said turbine located downstream from said discharge and receiving gas including steam and carbon dioxide from said discharge of said gas generator, said turbine including means to drive said electric generator.

7. The system of claim 6 wherein said power generating means includes at least two turbines with a reheater interposed between at least one adjacent pair of said turbines.

8. The system of claim 1 wherein said power generation means is a turbine coupled to an electric generator; said turbine having a turbine discharge coupled to a condenser for condensation of portions of said gas including water into a liquid state and separation of portions of said gas including carbon dioxide which remain in a gaseous state.

9. The system of claim 8 wherein at least one feed water pump returns a portion of the water condensed by said condenser back to said gas generator, and wherein a portion of the gas generated by said gas generator and expanded through said turbine is tapped off to provide heat to the water between said feed water pump and said gas generator.

10. The system of claim 1 wherein a combustion chamber is provided within said enclosure, said combustion chamber being upstream from said mixing chamber, said combustion chamber including means for combining the fuel from said fuel inlet with the oxygen from said oxygen inlet before the fuel and oxygen combust and are mixed as combusted gases with the water from said water flow inlet.

11. The system of claim 10 wherein a portion of said enclosure wall adjacent said combustion chamber includes means for metering and mixing said oxygen and said fuel to obtain complete combustion.

12. The system of claim 1 wherein a combustion chamber is provided downstream from said oxygen inlet and said fuel inlet, and upstream from said mixing chamber.

13. The system of claim 12 wherein said combustion chamber includes passages providing cooling water to said combustion chamber.

14. A power generating system which combusts hydrocarbon fuel while emitting no nitrogen containing compounds, comprising in combination:
 a source of hydrocarbon or alcohol fuel, at least one of the compounds in the fuel including the element carbon;
 a source of oxygen, free of nitrogen;
 a source of water, said source of water at least partially including water generated within said system as a product of combustion of the fuel with the oxygen;
 a gas generator having a walled enclosure with a center line, said gas generator including a fuel inlet passing through a wall of said enclosure and coupled to said source of fuel, an oxygen inlet passing through said wall of said enclosure and coupled to said source of oxygen, means to ignite said fuel, a means to combust the fuel with the oxygen to generate a gas consisting of steam and carbon dioxide as products of combustion, a water inlet coupled to said source of water, said water inlet passing through said wall of said enclosure, a mixing chamber oriented within said enclosure wherein products of combustion of the fuel and the oxygen mix with the water from said water flow inlet and a discharge for products of combustion generated within said gas generator and the water that is inputted into said enclosure from the water inlet to exit from said gas generator, said products of combustion having more steam than carbon dioxide;
 wherein said fuel inlet and said oxygen inlet are located within an induction head portion of said enclosure, said induction head having a planar side facing said enclosure, said planar side supporting said fuel inlet and said oxygen inlet;
 wherein said planar side of said induction head is perpendicular to a direction of fuel and oxygen flow into said enclosure;
 wherein said enclosure includes at least three separate units including said induction head, an adapter block and said mixing chamber;
 wherein said discharge is located in said mixing chamber of said enclosure at a location on said mixing chamber most distant from said induction head;
 wherein said adapter block includes a hollow cylindrical shroud having a central axis aligned perpendicular to said planar side of said induction head in a position which corresponds with said center line of said enclosure, said cylindrical shroud having a first end adjacent said induction head and a second end opposite said first end, said second end located free from contact with said walls of said enclosure;
 wherein said shroud includes a hollow interior and an exterior surface facing away from said hollow interior, said fuel inlet and said oxygen inlet oriented within said hollow interior, said water inlet located outside of said hollow interior and adjacent said exterior surface of said shroud, said second end of said shroud having a tapered throat thereon, said tapered throat having a diameter less than a diameter of said first end of said cylindrical shroud adjacent said planar side of said induction head;
 means to extract power from high energy products of combustion within said gas generator without emission of nitrogen into the environment; and
 means for separating and collecting carbon dioxide from the products of combustion discharged from the gas generator, said power extraction means coupled to said discharge.

15. The power generating system of claim 14 wherein said fuel is substantially free of chemical elements which can form common pollutants, and includes elements taken from the group including one or more of the elements hydrogen, carbon and oxygen, and
 means to deliver said fuel and said oxygen into said gas generator at the stoichiometric ratio necessary for combustion of the fuel with the oxygen to produce substantially only water and carbon dioxide exiting said discharge of said gas generator.

16. The power generating system of claim 15 wherein said gas generator includes a means to provide thermal control of a combustion reaction occurring within said walled enclosure of said gas generator, said thermal control means including said water inlet delivering water from said source of water into said gas generator at a position spaced from said oxygen inlet and said fuel inlet by a distance sufficient to prevent the fuel from mixing with the water entering said enclosure from said water inlet before combusting.

17. The power generating system of claim 16 wherein said power extraction means includes a turbine coupled to said discharge such that products of combustion within said gas generator drive said turbine, said turbine coupled to a power generating device.

18. The system of claim 14 wherein a combustion chamber is provided within said enclosure, said combustion chamber being upstream from said discharge, said combustion chamber including means for combining the fuel from said fuel inlet with the oxygen from said oxygen inlet before the fuel and oxygen combust and are mixed as combusted gases with the water from said water inlet.

19. The system of claim 18 wherein a portion of said enclosure wall adjacent said combustion chamber includes means for metering and mixing said oxygen and said fuel to obtain complete combustion.

\* \* \* \* \*